United States Patent [19]
Oenes et al.

[11] Patent Number: 6,031,676
[45] Date of Patent: Feb. 29, 2000

[54] SYSTEM FOR SENSING A TAPE CARTRIDGE

[75] Inventors: Leon C. Oenes, Broomfield; Thomas D. Steury, Longmont; Philip M. Morgan, Berthoud, all of Colo.

[73] Assignee: Storage Technology Corporation, Louisville, Colo.

[21] Appl. No.: 09/057,699

[22] Filed: Apr. 9, 1998

[51] Int. Cl.[7] .......................... G11B 15/04; G11B 5/008
[52] U.S. Cl. .............................................. 360/60; 360/94
[58] Field of Search ....................................... 360/60, 94

[56] References Cited

U.S. PATENT DOCUMENTS 5,748,418  5/1998  Griffin et al. ........................... 360/128
5,889,632  3/1999  Aoki ......................................... 360/94

*Primary Examiner*—W. Chris Kim
*Attorney, Agent, or Firm*—Wayne P. Bailey; Paul M. Schwartz

[57] ABSTRACT

A tape deck system uses four sensors to read features on a tape cartridge to determine control operations. A first sensor determines and a second sensor indicate a condition from a set comprising standard tape cartridge present with file protect, standard tape cartridge present without file protect, cleaning cartridge present, and a standard cartridge quiescent state. The remaining two sensors are used with a special cartridge. The special cartridge has features that indicate, to the first two sensors, that the tape deck system is in the standard cartridge quiescent state. A third and fourth sensors then read features on the special cartridge indicating cartridge type and file protect status. This system allows special cartridges, such as those that may contain thin tape, to only be accessed by tape deck systems equipped to handle the special cartridges. The sensor for indicating the special cartridge type may be modified to also indicate that the cartridge is properly seated in the tape deck.

10 Claims, 5 Drawing Sheets

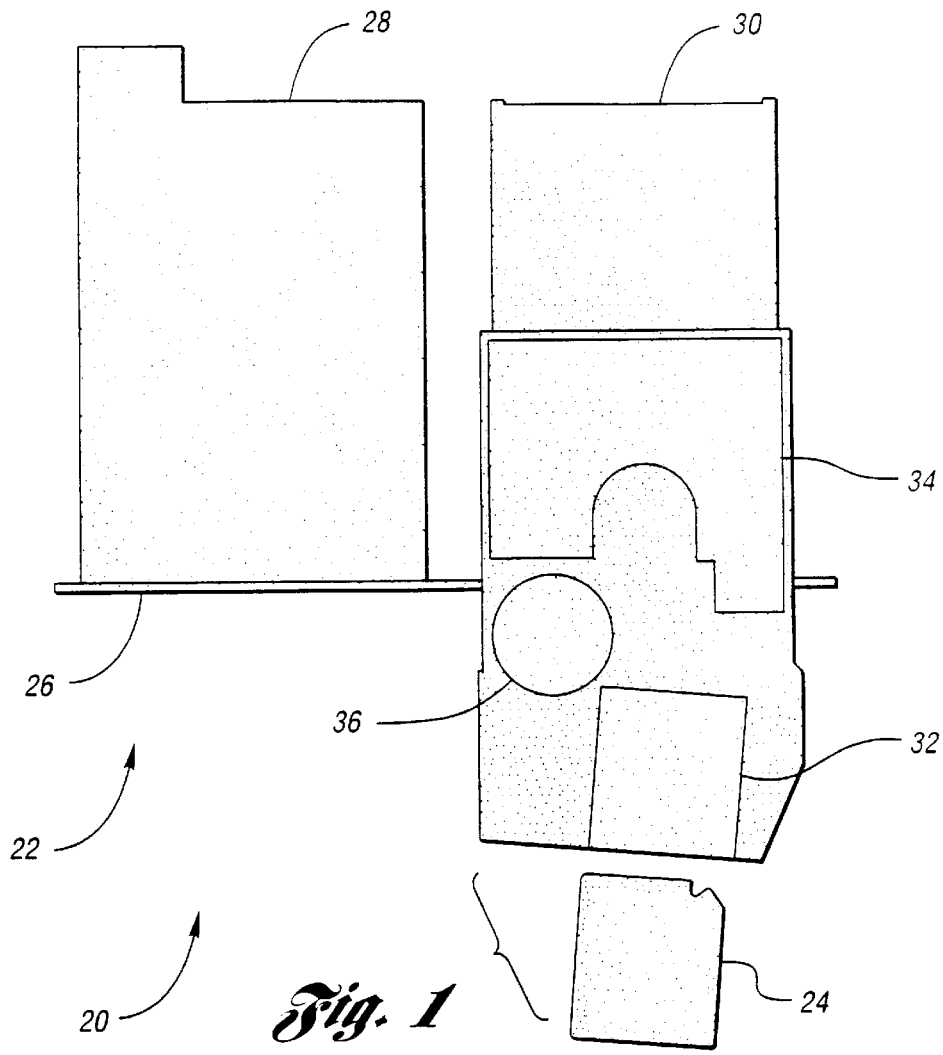
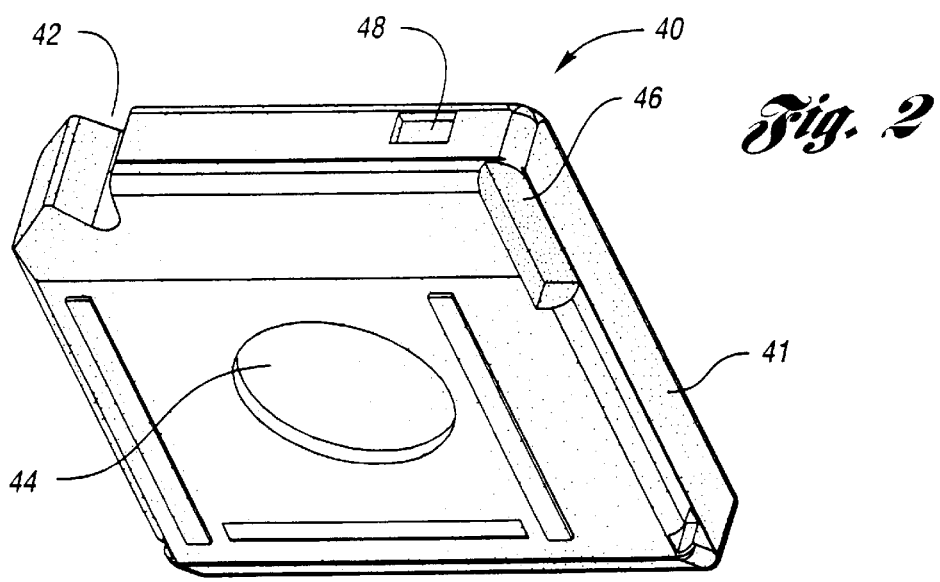

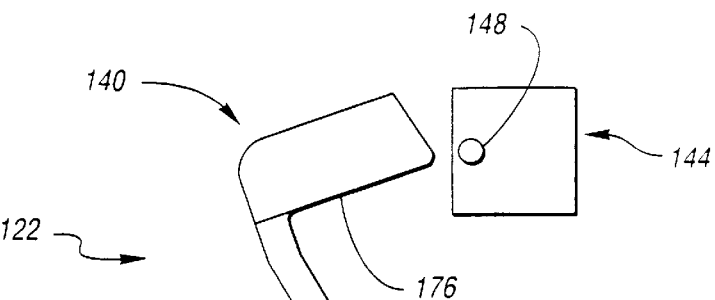
*Fig. 9a*
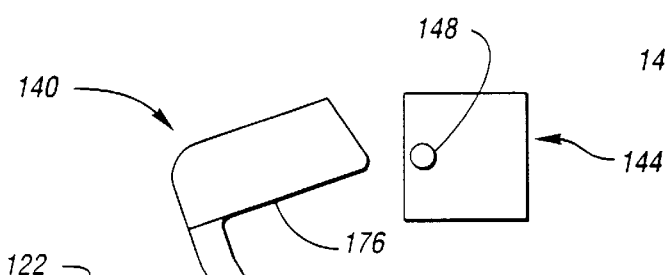
*Fig. 9b*
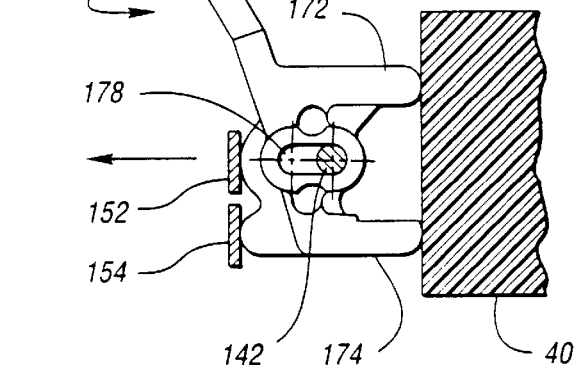
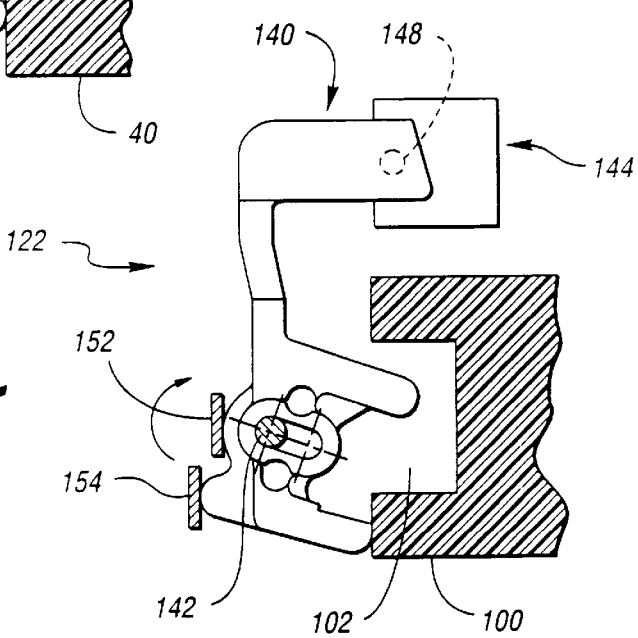
*Fig. 9c*

SYSTEM FOR SENSING A TAPE CARTRIDGE

TECHNICAL FIELD

The present invention relates to detecting the type and protection of a tape cartridge.

BACKGROUND ART

Tape systems allow large amounts of data to be stored in a cost effective manner. Tape systems include tape cartridges, which hold tape coated with a magnetic medium, and tape decks, which contain electronics capable of writing to and reading from the magnetic tape.

In order to prevent accidentally writing over saved data, many tape cartridges include a feature that allows the tape to be file protected. A sensor in the tape deck detects the file protect feature and will not allow data to be written to the tape.

Over time, heads in the tape deck responsible for writing to and reading from the tape become covered with contaminants. These contaminants may come from deterioration of the tape or from external dirt and debris. A cleaning cartridge can be inserted into the tape deck for cleaning the heads and other deck elements. In order to prevent attempts to write to or read from the cleaning cartridge, one or more features on each cartridge indicate whether the cartridge is for cleaning or for data storage. Corresponding sensors in the tape deck detects the cleaning cartridge feature and will not allow data access with a cleaning cartridge.

As tape technology improves, special designs such as, for example, thinner tape, are being developed. One difficulty with the new tapes is an increased possibility to crease, slit, or tear, destroying the tape and possibly damaging the tape deck. To avoid these problems, new drive mechanisms are being developed. However, the same basic tape cartridge format is used for standard and special tapes. What is needed is an ability to distinguish between standard and special tapes that prevents special tapes from being used on tape decks that do not have the proper drive mechanisms and that allows standard tapes to be used on tape decks with new mechanisms.

SUMMARY OF THE INVENTION

It is an object of the present invention to sense whether a cartridge is a standard cartridge or a special cartridge.

Another object of the present invention is to prevent tape decks without the proper drive mechanisms from accessing thin tape.

Still another object of the present invention is to sense if a cartridge is file protected for either a standard cartridge or a special cartridge.

Yet another object of the present invention is to sense if a cleaning cartridge is present.

A further object of the present invention is to add thin tape capability without extensive modifications throughout the tape deck.

A still further object of the present invention is to be able to detect when a special cartridge is properly seated within the tape deck.

In carrying out the above objects and other objects and features of the present invention, a system is provided for determining access to a tape cartridge, the tape cartridge being either a standard tape cartridge, a cleaning cartridge, or a special cartridge, the system including an elevator into which the cartridge can be inserted, a first sensor on the elevator to detect a first feature on the cartridge, and a second sensor on the elevator operative to detect a second feature on the cartridge. The first sensor and the second sensor indicate one of four conditions: standard tape cartridge present with file protect, standard tape cartridge present without file protect, cleaning cartridge present, and a standard cartridge quiescent state. The system includes a third sensor on the elevator to detect a third feature, the third feature indicating that the special cartridge is present when the first sensor and the second sensor indicate the standard cartridge quiescent state. The system also includes a fourth sensor on the elevator to detect a fourth feature, the fourth feature indicating special cartridge file protect status when the first sensor and the second sensor indicate the standard cartridge quiescent state.

In one embodiment, the special cartridge contains thin tape.

In another embodiment, the system further includes a control logic to determine a first output signal indicating that the tape cartridge is present and to determine a second output signal indicating file protect status from the output of the four sensors.

In still another embodiment, the fourth sensor can determine that the special cartridge is seated in the elevator.

A switch for detecting that a special cartridge is seated in a deck is presented. The special cartridge is distinguished from a standard cartridge by the presence of a notch in the special cartridge. The switch includes a support member, a first arm connected to the support member, a second arm connected to the support member, a means for coupling the support member to the deck, the means allowing the support member to move relative to the deck, and a sensor for detecting the position of the support member. When no cartridge is seated in the deck, the support member is in a first position. When the standard cartridge is seated in the deck, the cartridge contacts the first arm and the second arm, placing the support member in a second position. When the special cartridge is seated in the deck, the cartridge contacts the second arm and not the first arm, placing the support member in a third position.

In one embodiment, the switch support member is outside of the tape deck insertion slot, and the first arm and the second arm extend into the insertion slot.

In another embodiment, the support member has an oval slot, the longitudinal axis of the oval slot substantially parallel with the first arm and the second arm, the means for coupling the support member to the deck comprising an axle through the oval slot and into the deck, whereby the second position results from the support member sliding along the axle and the third position results from the support member rotating about the axle.

In yet another embodiment, a spring is used to bias the support member in the first position when no cartridge is seated in the deck.

In a further embodiment, a flag is attached to the support member. The sensor includes a light source and a light detector to detect the light source. The flag blocks the light source from the light detector when the support member is in the third position and the flag does not block the light detector from the light source when the support member is in the first position or the second position.

In the preferred embodiment, all of the above embodiments are included.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a diagram showing a top view of a "square tape" tape system;

FIG. 2 is a diagram of a tape cartridge prior to the present invention;

FIGS. 9A through 9C are sections illustrating the operation of the switch shown in FIG. 8.

BEST MODES FOR CARRYING OUT THE INVENTION

Figure 3:
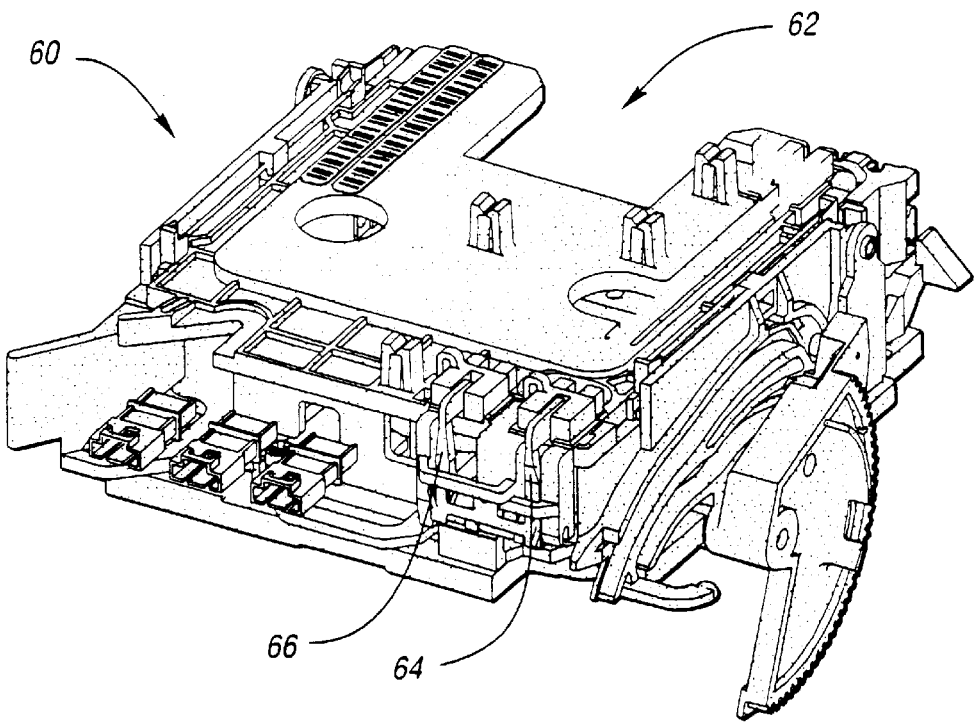
FIG. 3 is a diagram of a tape deck elevator prior to the present invention.

Referring now to FIG. 1, a diagram of a "square tape" tape system is shown. A tape system, shown generally by 20, includes a tape deck, shown generally by 22, and tape cartridge 24. Tape deck 22 uses motherboard 26 to hold logic cardcage 28 and transport 30. Logic cardcage 28 holds logic cards, not shown for clarity, for control and data manipulation. Transport 30 includes elevator 32, head area 34, and take up reel 36.

When tape cartridge 24 is inserted into elevator 32, sensors in elevator 32 measure features on tape cartridge 24 to determine the cartridge type, such as standard tape or cleaning, and file protect status. When a cartridge is recognized by the sensors, the elevator moves down and, if the cartridge contains tape, a leader block attached to the tape is towed through the head area and to the take up reel. Recording and playback with the tape can now occur.

Referring now to FIG. 2, a diagram of a tape cartridge prior to the present invention is shown. A standard "square tape" tape cartridge is shown generally by 40. Shell 41 forms a housing, protecting tape within cartridge 40. Tape is drawn out or fed into standard cartridge 40 through tape slot 42 in an end surface of shell 41. Hub opening 44 on the bottom of cartridge 40 contains a tooth mechanism that meshes with a hub in transport 30 to drive the tape.

Standard cartridge 40 may contain features to indicate the cartridge type and protect status. A first feature, cleaning notch 46, indicates a cleaning cartridge. If cleaning notch 46 is not present, cartridge 40 is a standard data tape cartridge and not a cleaning cartridge. A second feature, present file protect (FP) notch 48, indicates write protection. If present file protect notch 48 is in cartridge 40, cartridge 40 may only be read from. If the second feature is essentially flush with shell 41, tape from cartridge 40 may be read from or written to. The presence or absence of present file protect notch 48 may be implemented in several manners including a rotatable cylinder with a flat in a first position to indicate the presence of file protect notch 48 and a curved surface in a second position to indicate the absence of file protect notch 48. The cylinder may be rotated by hand to set the file protect to either writable or read only.

Referring now to FIG. 3, a diagram of a tape deck elevator prior to the present invention is shown. A standard elevator, shown generally by 60, is used in tape deck 22. Standard cartridge 40 is inserted into tape insertion slot 62. Once inserted, the state of features is determined by sensors. A first sensor, cartridge present (CP) sensor 64, detects the presence of cleaning notch 46. A second sensor, file protect sensor 66, detects the state of present file protect notch 48.

Figure 4:
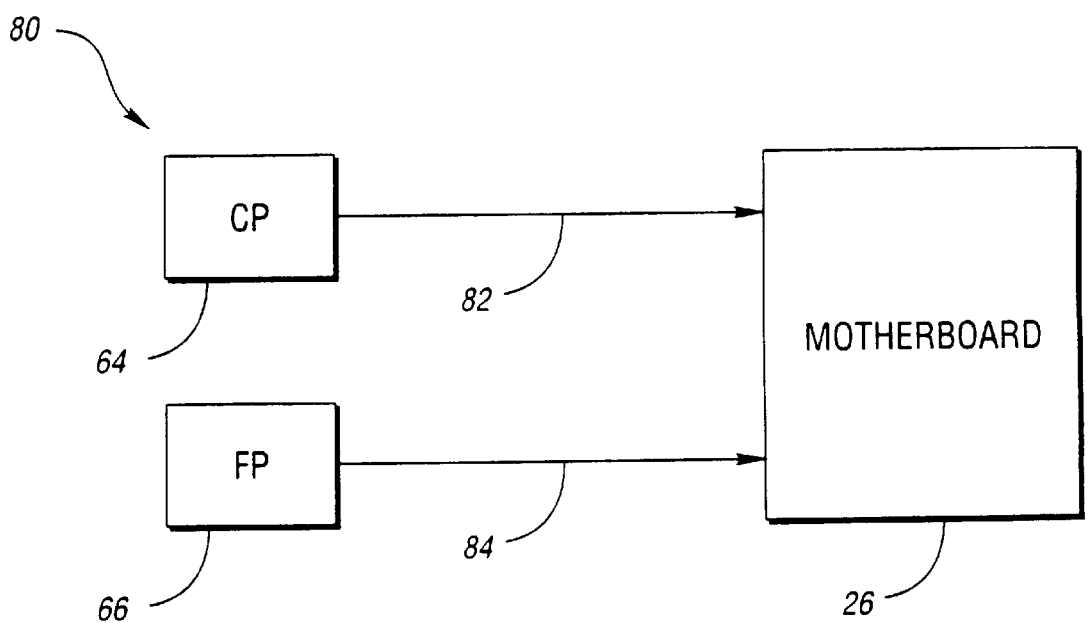
FIG. 4 is a block diagram of a control system prior to the present invention.

Referring now to FIG. 4, a block diagram of a control system prior to the present invention is shown. A standard control system, shown generally by 80, includes motherboard 26 in communication with cartridge present sensor 64 and file protect sensor 66. Logic in tape deck 22 uses CP signal 82 and FP signal 84 to determine control activities.

Cartridge present sensor 64 asserts CP signal 82 when cartridge 40 is a standard cartridge. When cartridge 40 is a standard tape cartridge, file protect sensor 66 asserts FP signal 84 when cartridge 40 is writable and deasserts FP signal 84 when cartridge 40 is write protected. The presence of a cleaning cartridge in elevator 60 is indicated by CP signal 82 being not asserted and FP signal 84 being asserted. Having CP signal 82 not asserted and FP signal 84 not asserted indicates a standard cartridge quiescent state (neither standard cartridge nor cleaning cartridge are present).

If cartridge present sensor 64 fails, CP signal 82 will be unasserted, indicating that a standard tape cartridge is not present. If file protect sensor 66 fails, FP signal 84 will be unasserted, indicating that the cartridge is write protected.

Figure 5:
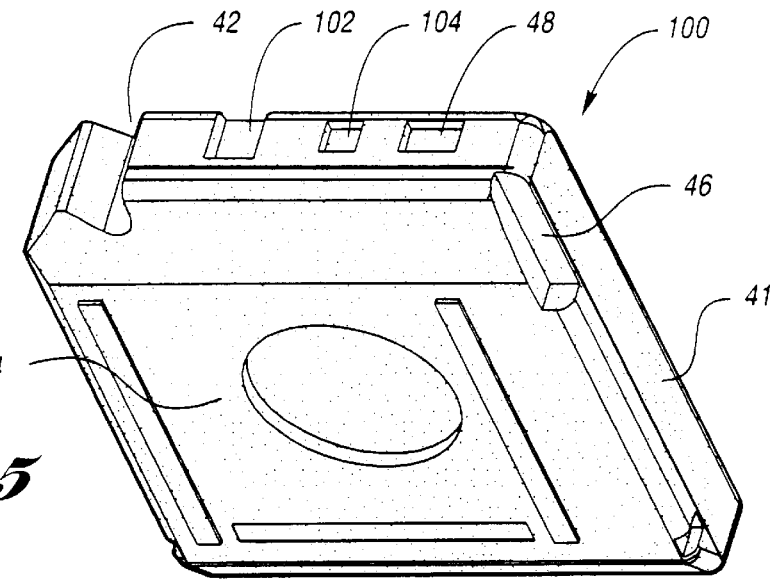
FIG. 5 is a diagram of a tape cartridge that may be used with the present invention.

Referring now to FIG. 5, a diagram of a tape cartridge that can be used in the present invention is shown. Shell 41 forms a housing, protecting tape within cartridge 100. Tape is drawn out or fed into special cartridge 100 through tape slot 42 in an end surface of shell 41. Hub opening 44 on the bottom of cartridge 100 contains a tooth mechanism that meshes with a hub in transport 30 to drive the tape.

Special tape cartridge 100 is used with special options such as, for example, thin tape. Thin tape requires special handling by tape deck 22 to prevent the tape from creasing, slitting, or tearing. Damage to the thin tape may not only cause loss of data, but may damage tape deck 22 as well. In order to prevent damage to thin tape and to tape deck 22 not designed to handle thin tape, standard cartridge 40, standard elevator 60, and standard control system 80 are modified. In order to minimize cost, it is desirable to have these modifications not affect motherboard 26.

To prevent special tape cartridge 100 from being used in tape system 22 with standard elevator 60, cleaning notch 46 and present file protect notch 48 are in shell 41. This indicates a quiescent state to standard elevator 60 and, hence, tape cartridge 100 will not load.

Since cleaning notch 46 and present file protect notch 48 are used to signal quiescent state when special cartridge 100 is in standard elevator 60, cleaning notch 46 and present file protect notch 48 cannot be used to indicate special cartridge present and special cartridge file protect. Two new features are required. A third feature, special fencing notch 102, indicates that cartridge 100 is a special cartridge. A fourth feature, special file protect notch 104, indicates write protection. If special file protect notch 104 is present in shell 41, cartridge 100 may only be read from. If special file protect notch 104 is not present in shell 41, cartridge 100 may be written to or read from.

Figure 6:
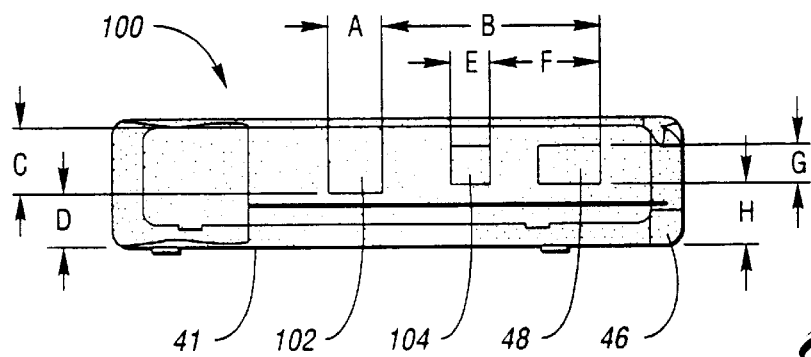
FIG. 6 is an edge view of the tape cartridge in FIG. 5.

Referring now to FIG. 6, an edge view of the tape cartridge in FIG. 5 is shown. In a preferred embodiment, the third and fourth features of cartridge 100 have dimensions as described below. Special fencing notch 102 is a rectangular region on shell 41. Special fencing notch 102 has a width dimension A of 0.410 inches and is located dimension B of 2.260 inches from the side edge containing cleaning notch 46. Special fencing notch 102 has a height dimension C of 0.502 inches and is located dimension D a minimum of 0.319 and a maximum of 0.400 inches from the bottom edge containing cleaning notch 46. Dimensions C and D sum to 0.902. Special file protect notch 104 is a rectangular region on shell 41. Special file protect notch 104 has a width dimension E of 0.300 inches and is located dimension F of 1.444 inches from the side edge containing cleaning notch 46. Special file protect notch 104 has a height dimension G of 0.291 inches and is located dimension H a minimum of 0.319 and a maximum of 0.465 inches from the bottom edge containing cleaning notch 46. Dimensions G and H sum to 0.756. When either or both of special fencing notch 102 and special file protect notch 104 are present, the indentation extends 0.175 inches into cartridge 100. All dimensions have a tolerance of ±0.010 inches.

Figure 7:
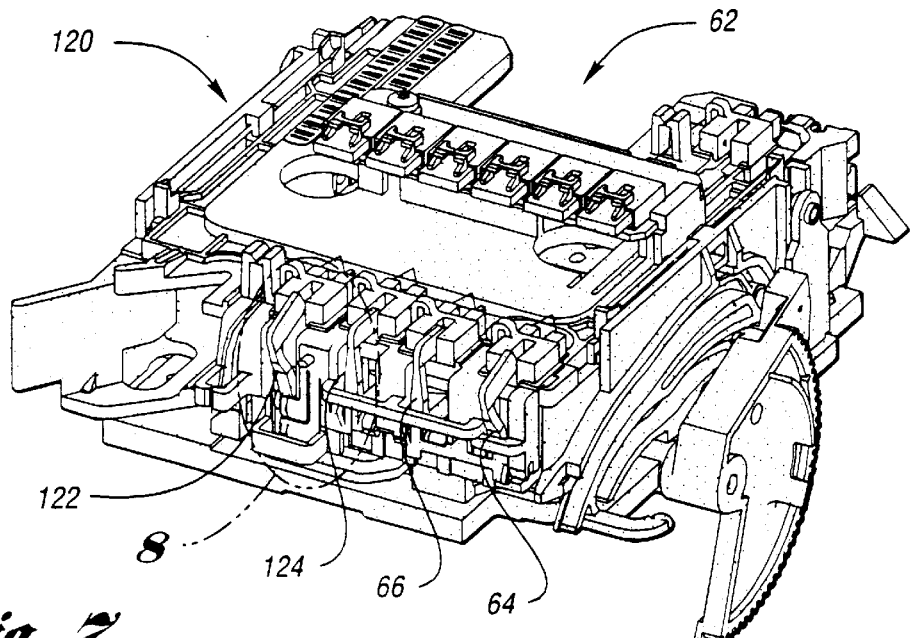
FIG. 7 is a diagram of a tape deck elevator according to the present invention.

Referring now to FIG. 7, a diagram of a tape deck elevator according to the present invention is shown. A special elevator, shown generally by 120, has a tape insertion slot 62 for accepting cartridge 40 or cartridge 100. Once in place, cartridge present sensor 64 and file protect sensor 66 determine the presence or absence of cartridge present cleaning notch 46 and present file protect notch 48 respectively. If cartridge 40 is either a standard cartridge or a cleaning cartridge, the output of cartridge present sensor 64 and file protect sensor 66 have the same meaning as described with regards to FIGS. 3 and 4 above. If the inserted cartridge is special cartridge 100, cartridge present sensor 64 and file protect sensor 66 indicate the standard cartridge quiescent state and additional sensors are required. A third sensor, second cartridge present sensor 122, detects the presence of special fencing notch 102. A fourth sensor, second file protect sensor 124, detects the presence of special file protect notch 104.

In an embodiment of the present invention, low asserting switches are used to implement first cartridge present sensor 64, first file protect sensor 66, second cartridge present sensor 122, and second file protect sensor 124. In particular, each switch is an inverted open-collector with a 1,000 ohm pull-up resistor.

Figure 8:
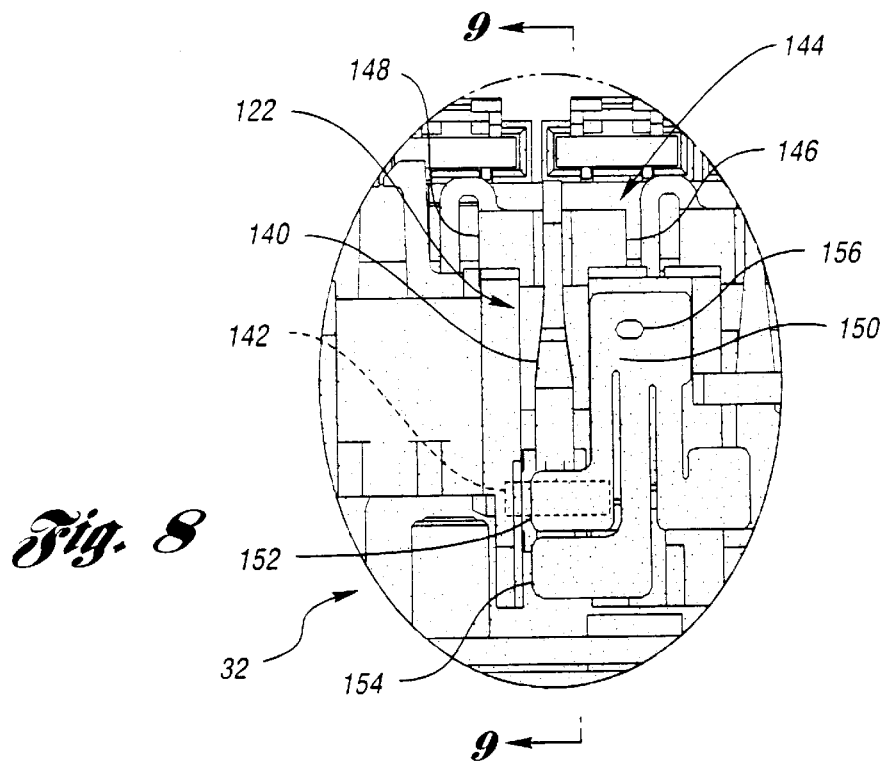
FIG. 8 is a diagram of a switch assembly that detects when a feature is present and the cartridge is seated according to the present invention.

Referring now to FIG. 8, a diagram of a switch assembly that asserts when a feature is present and the cartridge is seated is shown. A difficulty exists in distinguishing between the case when a cartridge with a notch is seated in elevator 32 and the case when no cartridge is seated, since both cases may register the same with a typical sensor. The problem is solved using a switch with three positions as described below.

Second cartridge present sensor, shown generally by 122, includes linkage 140 and position sensor 144. Linkage 140 is coupled to the remainder of elevator 32 by a means allowing linkage 140 to move relative to elevator 32. In the preferred embodiment, the means is axle 142, shown hidden in FIG. 8. Axle 142 is steel and linkage 140 is an engineering polymer. Axle 142 will be more fully described with regards to FIGS. 9A through 9C below. Other means include spurs molded as part of linkage 140, a deflecting spring, or the like as will be recognized by one of ordinary skill in the art.

Position sensor 144 can detect the position of linkage 140 relative to elevator 32. In a preferred embodiment, position sensor 144 is an optical sensor, having a light source 146 and a light detector 148. Light from light source 146 illuminates light detector 148 when no cartridge is present or when cartridge 40 is a standard tape or cleaning cartridge. When special cartridge 100 is properly seated in elevator 32, linkage 140 blocks light source 146 from illuminating light detector 148. The interaction of linkage 140 and position sensor 144 will be further explained with regards to FIGS. 9A through 9C below.

In a preferred embodiment, leaf spring 150 is used to bias linkage 140 into an unasserted position when no cartridge is seated in elevator 32. Leaf spring 150 has upper leaf 152 and lower leaf 154 contacting linkage 140. In a preferred embodiment, leaf spring 150 is made of steel and is heat staked to the remainder of elevator 32 with plastic stud 156.

Referring now to FIGS. 9A through 9C, sections illustrating the operation of the switch of FIG. 8 are shown. Linkage 140 is comprised of support member 170, first arm 172 extending forward from support member 170, and second arm 174 also extending forward from support member 170. In a preferred embodiment, linkage 140 includes flag 176 to provide a visual indication of the position of linkage 140 and to effectively block light emitted by light source 146 from reaching light detector 148 when flag 176 is between light source 146 and light detector 148. In FIGS. 9A through 9C, light detector 148 is shown as a circle in position sensor 144. Light source 146, cut away in the sectional views, is located so as to generate light which strikes light detector 148 with rays substantially perpendicular to the cut plane.

Support member 170 defines oval slot 178. Axle 142 extends through oval slot 178. Upper spring 152 and lower spring 154 bias support member 170 such that, when no cartridge in seated in elevator 32, axle 142 is in the back portion of oval slot, and flag 176 is not blocking light from light source 146 into light detector 148.

Referring now to FIG. 9B, the position of linkage 140 relative to position sensor 144 with standard cartridge 40 seated in elevator 32 is shown. Standard cartridge 40 contacts both first arm 172 and second arm 174, pushing linkage 140 such that axle 142 is substantially in the front of slot 178. Flag 176 is not blocking light from light source 146 into light detector 148.

Referring now to FIG. 9C, the position of linkage 140 relative to position sensor 144 with special cartridge 100 seated in elevator 32 is shown. Special cartridge 100 includes special fencing notch 102. Due to notch 102, first arm 172 does not contact special cartridge 100. However, second arm 174 does contact special cartridge 100. The action of first arm 172 and second arm 174 cause linkage 140 to rotate about axle 142. Flag 176 then blocks light emitted by light source 146 from reaching light detector 148. Therefore, position sensor 144 is able to detect when special cartridge 100 is seated.

Figure 10:
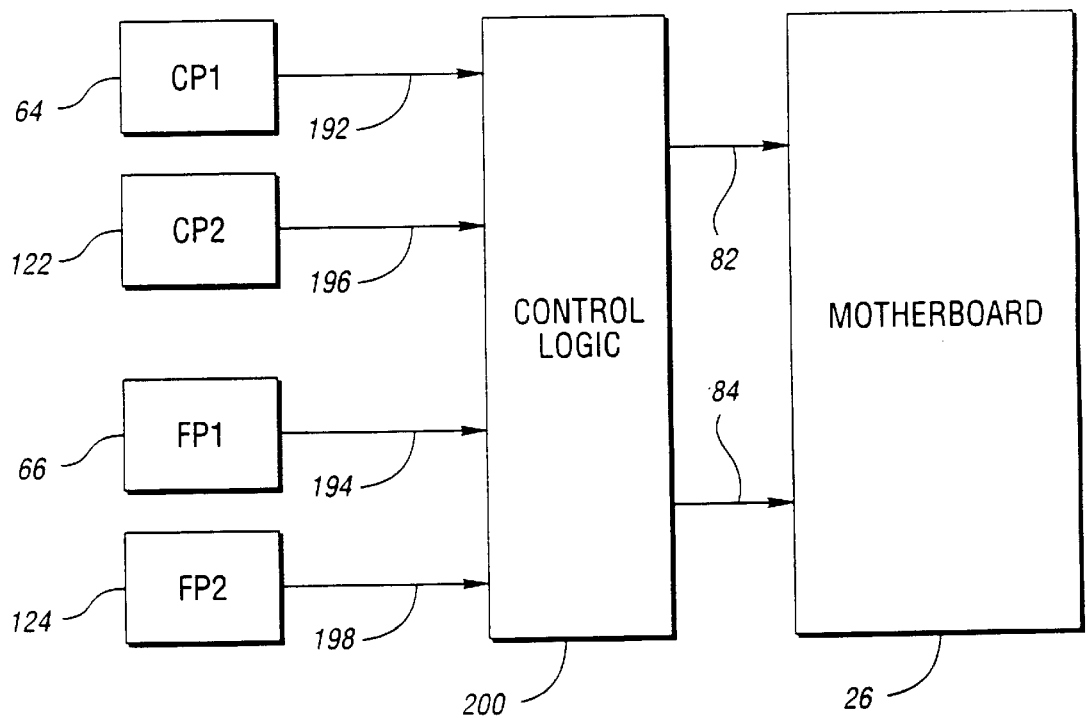
FIG. 10 is a block diagram of a control system according to the present invention.

Referring now to FIG. 10, a block diagram of a control system according to the present invention is shown. It is desired that, in order to minimize cost and for other reasons, changes to tape deck 22 outside of transport 30 be kept to a minimum. Therefore, CP signal 82, indicating the presence of a cartridge, and FP signal 84, indicating write protect status, remain as the signals entering motherboard 26. In order to condense signals from four sensors into two signals, modified control system 190 is used.

The first sensor, first current cartridge sensor 64, asserts CP1 signal 192 when standard cartridge 40 is a standard tape cartridge and deasserts CP1 signal 192 when standard cartridge 40 is a cleaning cartridge. The second sensor, file protect sensor 66, asserts FP1 signal 194 when standard cartridge 40 is writable and deasserts FP1 signal 194 when standard cartridge 40 is write protected. If both first cartridge sensor 64 and first file protect sensor 66 are unasserted, either no cartridge 40 is in deck 22, or special cartridge 100 is inserted. A third sensor, second cartridge present sensor 122, asserts CP2 signal 196 when special cartridge 100 is inserted. A fourth sensor, second file protect sensor 124, asserts FP2 signal 198 when special cartridge 100 is writable and deasserts FP2 signal 198 when special cartridge 100 is write protected.

Control logic 200 accepts CP1 signal 192, FP1 signal 194, CP2 signal 196, and FP2 signal 198, and determines CP signal 82 and FP signal 84, which are used by motherboard 26. CP signal 82 is asserted when either CP1 signal 192 or CP2 signal 196 is asserted. FP signal 84 is asserted when either CP1 signal 192 and FP1 signal 194 are asserted or when CP2 signal 196 and FP2 signal 198 are asserted.

A truth table describing the operation of control logic 200 is shown in Table I. Certain combinations are not applicable (N/A). In particular, since special fencing notch 102 and special file protect notch 104 are only used on special cartridge 100 where cleaning notch 46 is present and present file protect notch 48 is missing (resulting in CP1 signal 192 being unasserted and FP1 signal 194 being unasserted respectively), any combinations of CP2 signal 196 and FP2 signal 198 being asserted while either of CP1 signal 192 or FP1 signal 194 are asserted should not occur.

In a preferred embodiment, control logic 200 is implemented on a small printed circuit card. The card is designed to be mounted on transport 30.

While the best modes for carrying out the invention have been described in detail, other possibilities exist within the spirit and scope of the present invention. The elevator is a means for accepting a tape cartridge, and other mechanisms such as a stationary bay or a rotating turnstile may be used. Also, the type and order of sensors may be varied. Those familiar with the art to which this invention relates will recognize various alternative designs and embodiments for practicing the invention as defined by the following claims.

TABLE 1

| CP1 | FP1 | CP2 | FP2 | CP | FP | Operation |
|---|---|---|---|---|---|---|
| 0 | 0 | 0 | 0 | 0 | 0 | Quiescent State |
| 0 | 0 | 0 | 1 | 0 | 0 | N/A |
| 0 | 0 | 1 | 0 | 1 | 0 | Special: Protected |
| 0 | 0 | 1 | 1 | 1 | 1 | Special: Not Protected |
| 0 | 1 | 0 | 0 | 0 | 0 | N/A |
| 0 | 1 | 0 | 1 | 0 | 0 | Cleaning Cartridge |
| 0 | 1 | 1 | 0 | 1 | 0 | N/A |
| 0 | 1 | 1 | 1 | 1 | 1 | N/A |
| 1 | 0 | 0 | 0 | 1 | 0 | N/A |
| 1 | 0 | 0 | 1 | 1 | 0 | Standard: Protected |
| 1 | 0 | 1 | 0 | 1 | 0 | N/A |
| 1 | 0 | 1 | 1 | 1 | 1 | N/A |
| 1 | 1 | 0 | 0 | 1 | 1 | N/A |
| 1 | 1 | 0 | 1 | 1 | 1 | Standard: Not Protected |
| 1 | 1 | 1 | 0 | 1 | 1 | N/A |
| 1 | 1 | 1 | 1 | 1 | 1 | N/A |

What is claimed is:

1. A system for determining access to a tape cartridge, wherein the tape cartridge is of a type from a set including a standard tape cartridge, a cleaning cartridge, and a special cartridge, the system comprising:
   an elevator into which the cartridge can be inserted;
   a first sensor on the elevator operative to detect a first feature on the cartridge;
   a second sensor on the elevator operative to detect a second feature on the cartridge,
   wherein the first sensor and the second sensor are operative to indicate a condition from a set comprising standard tape cartridge present with file protect, standard tape cartridge present without file protect, cleaning cartridge present, and a standard cartridge quiescent state;
   a third sensor on the elevator operative to detect a third feature, the third feature indicative of special cartridge present when the first sensor and the second sensor indicate the standard cartridge quiescent state; and
   a fourth sensor on the elevator operative to detect a fourth feature, the fourth feature indicative of special cartridge file protect status when the first sensor and the second sensor indicate the standard cartridge quiescent state.

2. The system for determining access to a tape cartridge as in claim 1 wherein the special cartridge contains thin tape.

3. The system for determining access to a tape cartridge as in claim 1 further comprising a control logic in communication with the first sensor, the second sensor, the third sensor, and the fourth sensor, the control logic operative to determine a first output signal indicating cartridge present and to determine a second output signal indicating file protect status.

4. The system for determining access to a tape cartridge as in claim 1, the fourth sensor further operative to determine that the special cartridge is seated in the elevator.

5. A switch for detecting that a special cartridge is seated in a deck, the special cartridge distinguished from a standard cartridge by the presence of a notch in the special cartridge, the switch comprising:
   a support member;
   a first arm connected to the support member;
   a second arm connected to the support member;
   a means for coupling the support member to the deck, the means allowing the support member to move relative to the deck; and
   a sensor for detecting the position of the support member,
   whereby, when no cartridge is seated in the deck, the support member is in a first position, when the standard cartridge is seated in the deck, the standard cartridge contacts the first arm and the second arm, placing the support member in a second position, and when the special cartridge is seated in the deck, the special cartridge contacts the second arm and not the first arm, placing the support member in a third position.

6. The switch of claim 5, the deck having an insertion slot for accepting either the special cartridge or the standard cartridge, the support member being outside of the insertion slot, and the first arm and the second arm extending into the insertion slot.

7. The switch of claim 6, wherein the first arm and the second arm are substantially parallel, wherein the support member defines an oval slot, the longitudinal axis of the oval slot substantially parallel with the first arm and the second arm, and wherein the means for coupling the support member to the deck comprises an axle through the oval slot and into the deck, whereby the second position results from the support member sliding along the axle and the third position results from the support member rotating about the axle.

8. The switch of claim 5 further comprising a spring to bias the support member in the first position when no cartridge is seated in the deck.

9. The switch of claim 5 further comprising a flag attached to the support member, the sensor comprising a light source and a light detector operative to detect the light source, whereby the flag blocks light emitted by the light source from reaching the light detector when the support member is in the third position and the flag does not block the light detector from the light source when the support member is in each of the first position and the second position.

10. The switch of claim 5, wherein the first arm is disposed at least partially within the notch when the support member is in the third position.

* * * * *